(12) United States Patent
Elliott

(10) Patent No.: US 10,697,146 B2
(45) Date of Patent: Jun. 30, 2020

(54) HYDRAULIC SUPPLY SYSTEMS

(71) Applicant: COACH TRUCK & TRACTOR LLC, Conneaut, OH (US)

(72) Inventor: Kevin M. Elliott, Conneaut, OH (US)

(73) Assignee: COACH TRUCK & TRACTOR LLC, Conneaut, OH (US)

( * ) Notice: Subject to any disclaimer, the term of this patent is extended or adjusted under 35 U.S.C. 154(b) by 0 days.

(21) Appl. No.: 15/939,576

(22) Filed: Mar. 29, 2018

(65) Prior Publication Data
US 2018/0282967 A1 Oct. 4, 2018

Related U.S. Application Data

(60) Provisional application No. 62/478,170, filed on Mar. 29, 2017, provisional application No. 62/608,937, filed on Dec. 21, 2017.

(51) Int. Cl.
| B66B 23/00 | (2006.01) |
| F15B 21/08 | (2006.01) |
| E02D 7/14 | (2006.01) |
| F16B 7/04 | (2006.01) |
| B66C 23/00 | (2006.01) |
| E02D 7/08 | (2006.01) |
| F16B 2/20 | (2006.01) |
| F16B 1/02 | (2006.01) |
| F15B 1/26 | (2006.01) |
| F15B 21/042 | (2019.01) |

(52) U.S. Cl.
CPC ............... *E02D 7/14* (2013.01); *B66C 23/54* (2013.01); *E02D 7/08* (2013.01); *F15B 21/08* (2013.01); *F16B 2/205* (2013.01); *F16B 7/0426* (2013.01); *F15B 1/26* (2013.01); *F15B 21/042* (2013.01); *F16B 1/02* (2013.01)

(58) Field of Classification Search
CPC ... E02D 7/08; E02D 7/14; B66C 23/54; F15B 21/08; F16B 2/205; F16B 7/0426
See application file for complete search history.

(56) References Cited

U.S. PATENT DOCUMENTS

| 4,570,553 | A | * | 2/1986 | Ito | ........................... | A01B 79/00 |
| | | | | | | 111/118 |
| 4,915,180 | A | * | 4/1990 | Schisler | ................. | B25D 17/32 |
| | | | | | | 173/185 |
| 5,292,108 | A | * | 3/1994 | Sutton | .................... | E21B 19/008 |
| | | | | | | 175/203 |
| 5,490,740 | A | * | 2/1996 | Johnson | ................. | B25D 17/28 |
| | | | | | | 173/200 |
| 5,809,779 | A | * | 9/1998 | Bruso | ....................... | B09C 1/00 |
| | | | | | | 405/128.45 |

(Continued)

*Primary Examiner* — Benjamin F Fiorello
(74) *Attorney, Agent, or Firm* — Vorys, Sater, Seymour and Pease LLP

(57) ABSTRACT

Hydraulic supply systems and cranes incorporating the same are disclosed. Hydraulic supply systems may include an auxiliary hydraulic circuit that includes a pump, a power source, and a plurality of plumbing elements. The hydraulic supply systems may further include a control system that controls operation of at least a portion of the plurality of plumbing elements and a control panel that is positioned remotely from the control system and is in communication with the control system, where the control panel provides selective input to the control system.

7 Claims, 11 Drawing Sheets

(56) References Cited

U.S. PATENT DOCUMENTS

| | | | | |
|---|---|---|---|---|
| 6,221,224 B1* | 4/2001 | Hitchens | B01D 61/56 | 204/515 |
| 6,510,902 B1* | 1/2003 | Prokop | E02F 3/966 | 173/1 |
| 6,691,435 B1* | 2/2004 | Schultz | E01H 5/06 | 172/2 |
| 7,900,712 B2* | 3/2011 | Muona | E21B 44/06 | 173/11 |
| 2006/0081398 A1* | 4/2006 | Arian | E21B 49/06 | 175/58 |
| 2006/0118338 A1* | 6/2006 | Maybury, Jr. | E21B 21/015 | 175/213 |
| 2007/0169964 A1* | 7/2007 | Wheeler | E21B 7/04 | 175/26 |
| 2008/0056827 A1* | 3/2008 | Enns | E02F 5/10 | 405/184 |
| 2009/0255245 A1* | 10/2009 | Wu | F15B 1/021 | 60/327 |
| 2010/0086361 A1* | 4/2010 | Harrison | B66C 1/42 | 405/184 |
| 2013/0319765 A1* | 12/2013 | Piipponen | E21B 7/02 | 175/24 |
| 2014/0001818 A1* | 1/2014 | Van Mill | B60P 1/56 | 298/27 |
| 2014/0034329 A1* | 2/2014 | Skinnes | E21B 19/09 | 166/355 |
| 2014/0290768 A1* | 10/2014 | Randle | E21B 43/26 | 137/565.16 |
| 2014/0290972 A1* | 10/2014 | Robson | E02D 7/10 | 173/1 |
| 2015/0259993 A1* | 9/2015 | Patel | E21B 19/16 | 175/52 |
| 2015/0315858 A1* | 11/2015 | Gaskin | E21B 19/15 | 166/380 |
| 2016/0001432 A1* | 1/2016 | Kela | B25D 9/12 | 173/208 |
| 2016/0201353 A1* | 7/2016 | Niekamp | E04H 17/263 | 173/124 |

* cited by examiner

HYDRAULIC SUPPLY SYSTEMS

CROSS-REFERENCE TO RELATED APPLICATIONS

This application claims benefit of U.S. Provisional Application No. 62/478,170, filed Mar. 29, 2017, and U.S. Provisional Application No. 62/608,937, filed Dec. 21, 2017, the disclosures of which are incorporated by reference herein in their entirety.

TECHNICAL FIELD

The present disclosure is directed to auxiliary hydraulic supply systems and, in particular, auxiliary hydraulic supply systems for oil field service applications.

BACKGROUND

Conventionally known hydraulic equipment may be used in a variety of industries and across a variety of applications. Such hydraulic equipment uses fluid at elevated pressure to transfer power. In various embodiments, the hydraulic fluid may be used to perform transfer power or control to a piece of hydraulic equipment that is positioned remotely from the source of the elevated pressure fluid.

It is conventionally known to run a plurality of hydraulic services off of a single hydraulic supply system. For example, in an oil field services application in which a crane has a hydraulic supply system, the hydraulic supply system may supply motive force to reposition the crane itself and its components, and may also supply motive force to operate hydraulic accessories that are selectively mounted to the crane, for example a hydraulic pile driver, an auger, or a screw piling. However, by directing a portion of the energy that is captured in the hydraulic fluid to the hydraulic accessories, energy is directed away from the remaining components of the crane.

In some embodiments, the hydraulic supply system of the crane may not include substantial overhead, such that directing energy to the hydraulic accessories and away from the components of the crane itself may reduce the function of the components of the crane.

Accordingly, auxiliary hydraulic supply systems that operate independently of the primary hydraulic system with which they are both associated may be desired.

SUMMARY

In one embodiment, a hydraulic supply system may include an auxiliary hydraulic circuit that includes a pump, a power source, and a plurality of plumbing elements. The hydraulic supply system may further include a control system that controls operation of at least a portion of the plurality of plumbing elements and a control panel that is positioned remotely from the control system and is in communication with the control system, where the control panel provides selective input to the control system.

In another embodiment, a crane may include an undercarriage, a superstructure pivotally coupled to the undercarriage, a jib pivotally coupled to the superstructure, and a luffing cylinder coupled to the superstructure and the jib. The crane further includes a hydraulic system in fluid communication with the luffing cylinder, the hydraulic system providing energy to the luffing cylinder through pressurized hydraulic fluid. The crane also includes an accessory apparatus coupled to the jib, and a hydraulic supply system in fluid communication with the accessory apparatus, the hydraulic system providing energy to the accessory apparatus through pressurized hydraulic fluid.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Reference will now be made in detail to embodiments of auxiliary hydraulic supply systems. Various embodiments of auxiliary hydraulic systems will be described in more detail herein.

Auxiliary hydraulic supply systems may modify the energy provided throughout a hydraulic system, so that the energy consumed by components of the hydraulic system is balanced, and so that all components of the hydraulic system have sufficient energy to perform their desired functions at all times. By incorporating an auxiliary hydraulic supply system according to the present disclosure into a conventional hydraulic system, the auxiliary hydraulic supply system can provide additional capacity to deliver energy via hydraulic fluid to the components of the hydraulic system.

In equipment that includes a conventional hydraulic system, the hydraulic system may direct hydraulic fluid to multiple hydraulic actuators that perform certain tasks. However, as external accessories that also consume energy from the hydraulic system are added to the equipment, the energy that may be directed to the original components of the equipment may be reduced. Because of this reduction in available energy, certain components of the equipment may not perform according to their design intent. Embodiments according to the present disclosure include an auxiliary hydraulic supply system that provides additional energy that may be consumed by the accessories that are added to a piece of equipment. By supplementing the hydraulic system of the equipment, the auxiliary hydraulic supply system may provide sufficient energy such that the original components of the equipment and the accessories are provided with sufficient energy.

Figure 1:
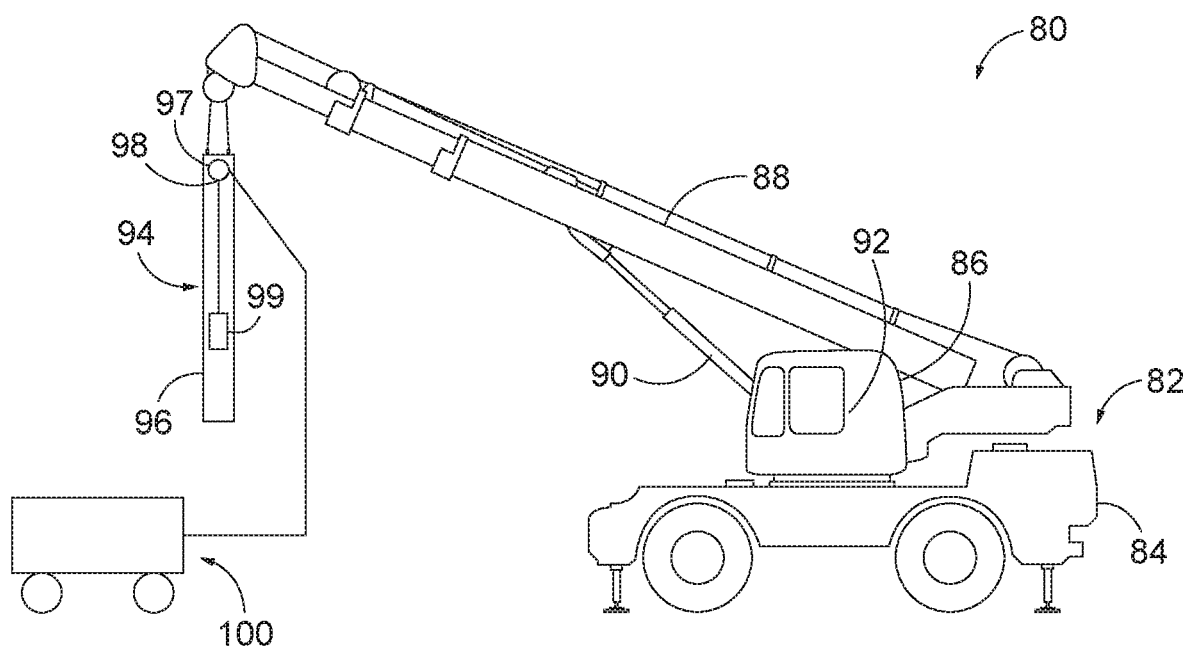
FIG. 1 depicts a side perspective view of a crane system according to one or more embodiments shown or described herein.

Referring now to FIG. 1, a piece of equipment 80 is depicted. The equipment 80 depicted in FIG. 1 is a crane 82, however, other equipment that includes a hydraulic system is envisioned within the scope of the present disclosure. The crane 82 may include, among other elements, an undercarriage 84 and a superstructure 86 that is positioned above the undercarriage 84. The crane 82 also includes jib 88 that is pivotally mounted to the superstructure 86 and a luffing cylinder 90 that connects the superstructure 86 to the jib 88. The luffing cylinder 90 may be in fluid communication with a hydraulic system 92 that provides hydraulic fluid to the luffing cylinder 90 at an elevated pressure. The hydraulic system 92 may also be in fluid communication with a rotation actuator that controls a rotational position of the superstructure 86 relative to the undercarriage 84.

In standard operation, the hydraulic system 92 may provide sufficient energy through the hydraulic fluid to control the relative movement of the superstructure 86 and the jib 88.

Still referring to FIG. 1, the crane 82 includes an accessory apparatus 94 that is mounted to the jib 88. In the depicted embodiment, the accessory apparatus 94 is a pile driver 96, however any of conventionally known accessories that may be mounted to such a crane 82 are envisioned including, for example and without limitation, a hammer, a drill, a hoist, a bucket, and a grapple. The pile driver 96 may include a hydraulic winch 97 that selectively raises the weight portion 99 of the pile driver 96 and a hydraulic clutch 98 that selectively disengages the weight portion of the pile driver 96. Under certain operating conditions with a conventional hydraulic system, the accessory apparatus 94 may consume a portion of the energy from the crane 82 hydraulic system that reduces operating capacity of the components of the crane 82.

In the depicted embodiment, the crane 82 further includes an auxiliary hydraulic supply system 100. The auxiliary hydraulic supply system 100 may be mounted on the crane 82 itself or may be positioned spaced apart from the crane 82, as depicted in FIG. 1.

In various embodiments, the auxiliary hydraulic supply system 100 provides additional energy to the accessory apparatus 94 and/or the components of the crane 82, such that additional power may be directed to the accessory apparatus 94 and/or the components, thereby preserving operational capacity of the components of the crane 82 and the accessory apparatus 94. In some embodiments, the auxiliary hydraulic supply system 100 may be placed in fluid communication with the accessory apparatus 94. In some embodiments, the hydraulic supply system 100 may be placed into direct fluid communication with the accessory apparatus 94, and bypass the other components of the crane 82. In other embodiments, the hydraulic supply system 100 may be placed into fluid communication with the hydraulic system 92 of the crane 82.

Figure 2:
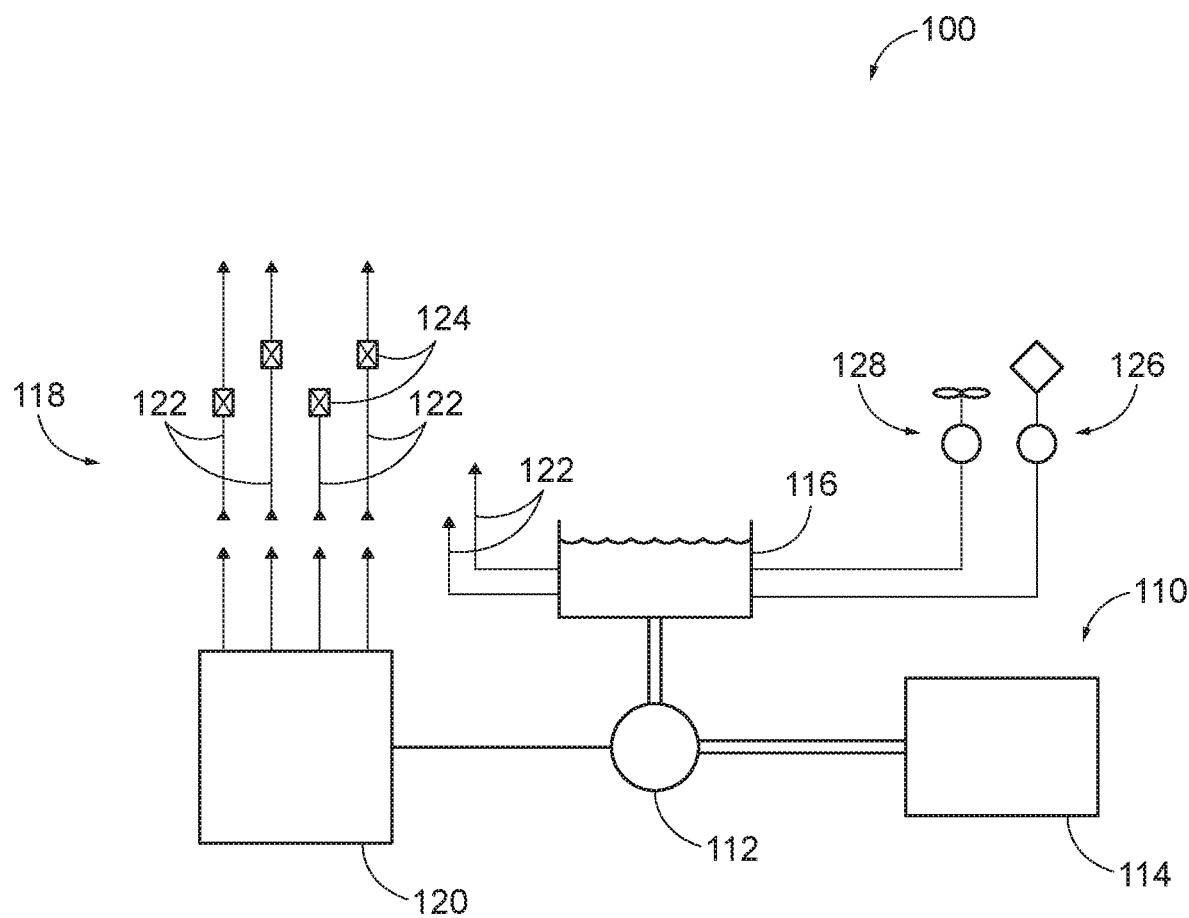
FIG. 2 depicts a schematic view of a hydraulic supply system according to one or more embodiments shown or described herein.

Referring now to FIG. 2, one embodiment of the hydraulic supply system 100 is depicted in greater detail. In the depicted embodiment, the hydraulic supply system 100 includes an auxiliary hydraulic circuit 110 that includes a pump 112, a power source 114, a reservoir 116, and a plurality of plumbing elements 118 through which pressurized and non-pressurized hydraulic fluid flows. The plumbing elements 118 may include a manifold 120, a plurality of hydraulic lines 122, and a plurality of valves 124. The hydraulic supply system 100 may also include a heater 126 and a cooler 128 that may heat or cool, respectively, the hydraulic fluid that flows through the auxiliary hydraulic circuit 110 such that the hydraulic fluid is maintained at a proper operational temperature.

Figure 3:
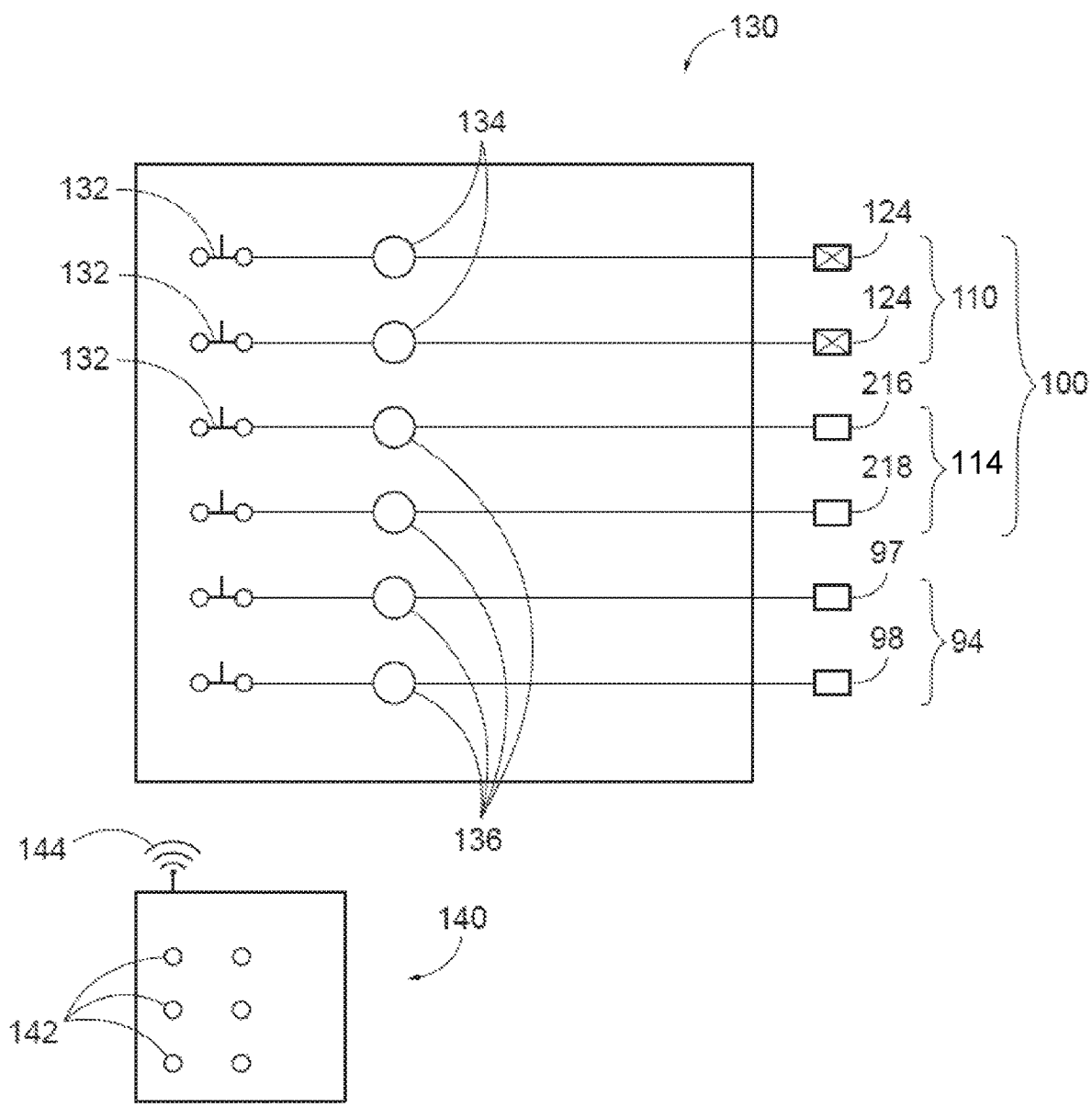
FIG. 3 depicts a schematic view of a control system for a hydraulic supply system according to one or more embodiments shown or described herein.
Figure 4:
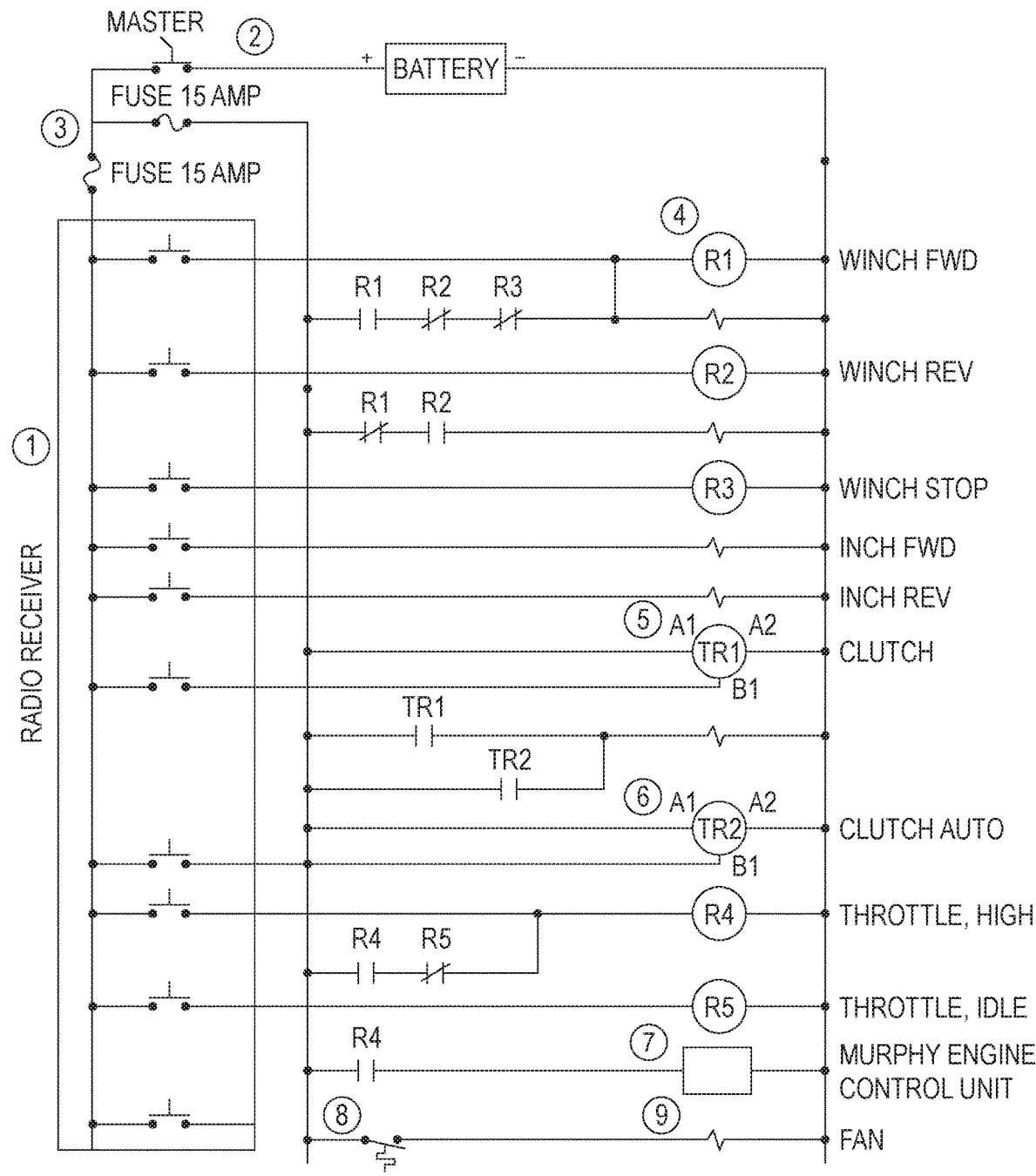
FIG. 4 is a detailed schematic of a control system for a hydraulic supply system according to one or more embodiments shown or described herein.

Referring now to FIG. 3, a control system 130 for the hydraulic supply system 100 is depicted. In the depicted embodiment, the control system 130 may include a plurality of switches 132. The control system 130 may also include a plurality of solenoids 134 that are in communication with corresponding switches 132. The solenoids 134 may be in communication with each of the valves 124 of the auxiliary hydraulic circuit 110, as depicted in FIG. 2. The control system 130 may also include a plurality of relays 136 that are in communication with corresponding switches 132. The relays 136 may be in communication with various components of the hydraulic supply system 100, including various components of the power source 114, including a power take-off clutch 216 and a throttle 218. The relays 136 may also be in communication with components of the accessory apparatus 94, for example, a hydraulic winch 97 and a hydraulic clutch 98.

The control system 130 may be in communication with a control panel 140. The control panel 140 may be located at a position spaced apart from the hydraulic supply system 100. In various embodiments, the control panel 140 may include a variety of switches 142 that correspond to the switches 132, solenoids 134, and relays 136 of the control system 130. The control panel 140 is in communication with the control panel 140 by a communication link 144, and the switches 142 of the control panel 140 may select operation of the corresponding component of the control system 130. In various embodiments, the control panel 140 may be placed in communication with the control system 130 through a wired connection or through a wireless connection. In one embodiment, the control panel 140 and the control system may be placed into communication with one another by a digital interconnect using a digital signaling circuit, for example, following a RS-422 or a RS-232 protocol. In other embodiments, the control panel 140 may be placed in communication with the control system 130 through a wireless connection, for example, a radio frequency link, such as a 902-928 MHz radio, a near-field communication link, such as Bluetooth®, or a wireless network, for example, protocols governed by IEEE 802.11.

The communication link between the control panel 140 and the control system 130 allows a user to remotely control the functionality of the hydraulic supply system 100 from a physical location that is separated from the hydraulic supply system 100 itself. This may be advantageous, for example, for a user who is positioned, for example, proximate to the superstructure 86 of the crane 82, as depicted in FIG. 1.

Through use of the remotely-positioned control panel 140, the user may remotely control the control system 130 and the associated components of the hydraulic supply system 100 to perform functions as desired by the user.

In one example, and referring again to FIG. 1, the hydraulic supply system 100 may be mated with a crane 82 that includes a pile driver 96 that is mounted as an accessory apparatus 94 of the crane 82. The pile driver 96 may include a hydraulic winch 97 that selectively raises the weight portion of the pile driver 96 and a hydraulic clutch 98 that selectively disengages the weight portion of the pile driver 96, such that the weight can traverse in a downward direction, thereby directing force into a pile.

Through incorporation of the hydraulic supply system 100 to the crane 82, the hydraulic supply system 100 may provide energy to the pile driver 96 to selectively operate the hydraulic winch 97 and the hydraulic clutch 98. By including the hydraulic supply system 100 that includes the remotely-operated control panel 140, the user may operate the hydraulic supply system 100, and therefore the pile driver 96, from a position remote from the hydraulic supply system 100 itself, for example, from an operator's cab that is positioned on the superstructure 86 of the crane 82. The hydraulic supply system 100 may operate the components of the pile driver 96 without affecting operation of the hydraulic system of the crane 82.

It should now be understood that hydraulic supply systems according to the present disclosure include an auxiliary hydraulic supply circuit that includes a pump, a power source, and a plurality of plumbing elements, along with a control system and a control panel that may be positioned remotely from the control system. The control panel allows for a user to remotely actuate the various components of the auxiliary hydraulic system from a position remote from the control panel itself. The hydraulic supply system, therefore, may provide supplemental energy to satisfy a hydraulic accessory apparatus without affecting operation of a separate hydraulic system.

Figure 5:
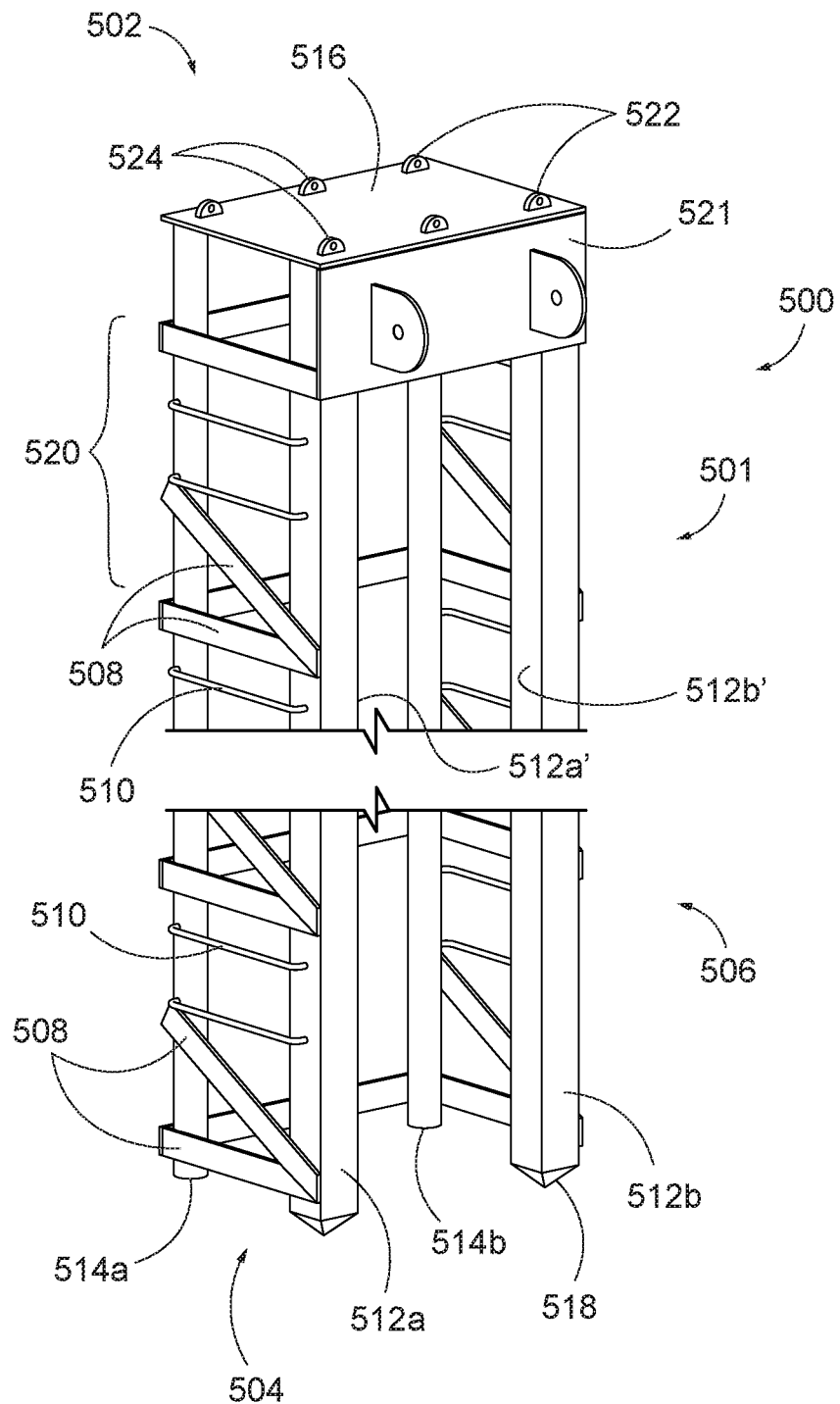
FIG. 5 illustrates a perspective partial view of a pile driver according to one or more embodiments of the present disclosure.

In some embodiments, the hydraulic supply system 100 is operatively connected to another piece of equipment, for example, a pile driver. FIG. 5 illustrates a pile driver 500, according to one or more embodiments of the present disclosure. The pile driver 500 may include a derrick assembly 501 that may be installed over an object to be driven. As detailed below with reference to FIGS. 8-10, the pile driver 500 may include hammer that is configured to be released from the derrick assembly 501 and impact the object to be driven.

The derrick assembly 501 is a tower structure that includes a top 502, a bottom 504, and a plurality of derrick support members 506 extending between the top 502 and the bottom 504. It will be appreciated that, while four derrick support members 506 are illustrated, more or less may be utilized in other embodiments. In addition, the derrick support members 506 may be interconnected to one another to provide additional structural rigidity or support, for example, via a plurality of lattice braces or cross members 508. Moreover, a plurality of ladder rungs 510 may be provided on the derrick support members 506. Here, the derrick support members 506, cross members 508, and ladder rungs 510 are made from metal such as steel, however, other materials may be utilized as known in the art without departing from the present disclosure.

Here, the derrick support members 506 include a pair of rails or tubes 512a,b and a pair of pipes 514a,b that all extend from the bottom 504 and are secured at the top 504 via a top plate 516. In the illustrated embodiment, the tubes 512a,b are rectangular in cross section and are configured to operate as guides for a pile driver assembly 804 as hereinafter described with reference to FIGS. 8-10. Thus, the tubes 512a,b may extend inward towards each other (or have rail portions extending inward) and that correspond with channels formed into a pile driver assembly 804 so that they may operate as rails for guiding the pile driver assembly riding thereon as hereinafter described. Here, each of the tubes 512a,b includes a rail portion 512a',512b' on which a pile driver assembly may slide as hereinafter described. Also, the tubes 512a,b may include features 518 at the bottom 504 such as spikes or points that may be utilized to secure the derrick assembly 501 to the ground. However, the features 518 may be differently designed and the tubes 512a,b may have different geometries without departing from the present disclosure. Also, the pipes 514a,b are illustrated as having circular cross-sections and do not include features, but in other embodiments, they may have different cross-sections and/or may include features such as those illustrated with respect to the tubes 512a,b.

The pile driver 500 includes a winch or other mechanism to lift of hoist the pile driver assembly (see FIG. 8) within the derrick assembly 501. In some embodiments, the winch or other lifting mechanism is provided at a lifting area 520 where a lifting plate 521 is provided. The lifting plate 521 may be provided on any of the sides of the derrick assembly 501, on the inside or outside of the lifting plate 521, without departing from the present disclosure; however, in the illustrated embodiment, the lifting plate 521 is provided on a front face of the derrick assembly 521 on tubes 512a,b. The winch or other lifting mechanism not illustrated in FIG. 5 as, in this embodiment, it is mounted on an inside face of the lifting plate 521 and thus positioned inside the derrick assembly 501 and enclosed within the derrick support members 506, the top plate 516, and the lifting plate 521; however, in other embodiments, the winch or other lifting mechanism may be provided at the winch area 520 and be outside the derrick support members 506, the top plate 516, and/or the lifting plate 521, but still be arranged to lift a pile driver assemble within the derrick support members 506 as hereinafter described. In addition, the top plate 516 may include one or more features for attaching the pile driver 500 to other equipment, such as a crane. For example, a piece of equipment such as the crane 82 may grab the derrick assembly 501 and then position it as desired by connecting the jib 88 of the crane 82 to the top plate 516. Thus, the top plate 516 includes a plurality of lugs or other features that may be connected to another piece of equipment. Here, the top plate 516 includes a plurality of primary lugs 522 and a plurality of secondary lugs 524. In the illustrated embodiment, the top plate includes 4 primary lugs 522 that are positioned at the four corners of the top plate 516; however, more or less than 4 primary lugs 522 may be utilized in the same or different orientation relative to the top plate 516. Also, the illustrated embodiment includes 2 secondary lugs 524 that may be used to further secure the pile driver 500 to a piece of equipment, and these secondary lugs 524 are positioned in-between the primary lugs 522; however, more or less than 2 secondary lugs 524 may be utilized in the same or different orientation relative to the primary lugs 522.

Figure 6:
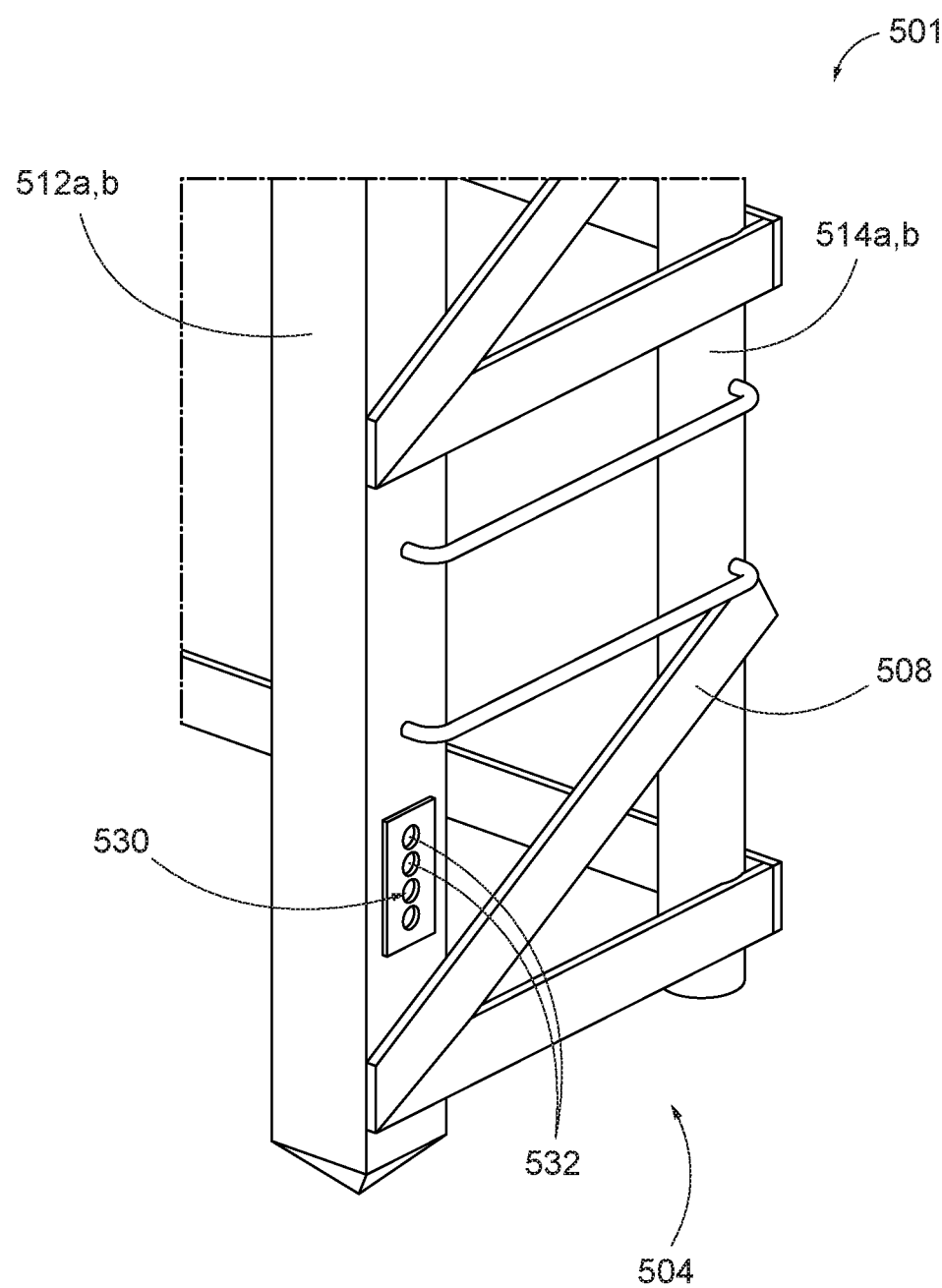
FIG. 6 illustrates a partial view of a derrick assembly and connection panel that may be utilized in the pile driver of FIG. 5, accordingly to one or more embodiments of the present disclosure.

FIG. 6 illustrates a connection panel 530 disposed on the derrick assembly 501 configured to provide power to the pile driver 500, accordingly to one or more embodiments of the present disclosure. Here, the connection panel 530 is a hydraulic input for integrating the pile driver 500 with a hydraulic system such as the auxiliary hydraulic supply system 100. The connection panel 530 includes a plurality of inputs 532 for receiving that, for example, may receive the plurality of hydraulic lines 122. Here, the connection panel 530 includes 3 inputs 532, but more or less may be utilized depending on the particular application without departing from the present disclosure. While the connection panel 530 is illustrated as being installed proximate to the base 504, it may be installed at various locations. Moreover, the connection panel 504 of the illustrated embodiment is illustrated as being installed on one or both of the tubes 512a,b, but in other embodiments may be installed on either or both of the pipes 514a,b in addition or instead of the tubes 512a,b.

Figure 7:
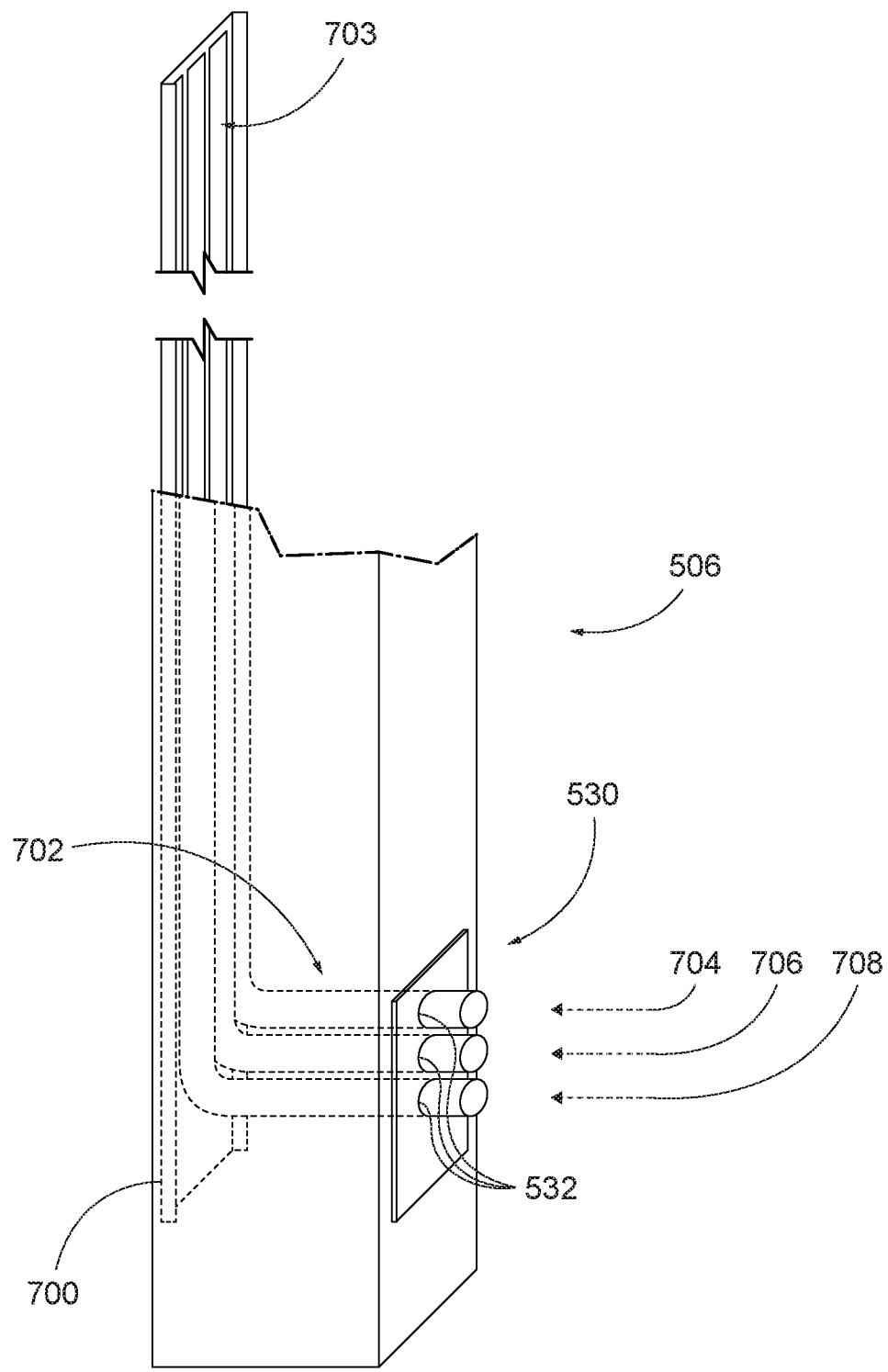
FIG. 7 illustrates a tray assembly that may be utilized with the derrick assembly and connection panel of FIG. 6, according to one or more embodiments of the present disclosure.

FIG. 7 illustrates a tray assembly 700 that may be utilized to organize a plurality of hoses 702 within any or all of the derrick support members 506 and which may also facilitate running the hoses 702 therethrough, according to one or more embodiments. In the illustrated embodiment, the tray assembly 700 is a removable structure having a tray 701 to which the hoses 702 are attached and which may be installed within any of the derrick support members 506. In some embodiments, the rigidity of the hoses 702 aligns and maintains the tray 701 in position within the derrick support members 506. However, any number of fasteners may be utilized to maintain the tray assembly 700 in a desire position and/or orientation within the derrick support members 506 without departing from the present disclosure. In other embodiments, the tray assembly 700 is a three-sided structure having a central element extending along a first interior side wall of the derrick support members 506 and pair of arms (not illustrated) that extend from the central element and correspond to the abutting second and third opposite side walls such that the three sides of the tray assembly 700 correspond to three corresponding interior surfaces of the derrick support members 506; alternatively, the tray assembly 700 may be a four sided structure that corresponds to the internal geometry of the derrick support members 506.

Here, the tray 701 is substantially flat but includes a plurality of grooves 703 having geometries that correspond with the particular one of the hoses 702 received therein. Thus, the tray 701 may include grooves 703 with different geometries depending on the geometry of the hoses 702. In addition, the hoses 702 may be strapped or otherwise secured to the tray 701 (or within the grooves 703) using any type of suitable fasteners as known in the art, without departing from the present disclosure. Moreover, the tray 701 may be configured with internal channels (not illustrated) that receive the hoses such that the hoses are enclosed and further protected and, in such embodiments, the hoses 702 may extend from such enclosed channels at the ends of the tray to connect to other components. The hoses 702 may be any type of hoses as known in the art and, in the illustrated embodiment, are steel hoses but may instead be rubber hoses. Each of the hoses 702 extends through an interior of the derrick support members 506 which, in the illustrated embodiments, is the front right tube 512b. Each of the hoses 702 extends through the interior of its derrick support members 506 and connects to a respective one of the inputs 532. In the illustrated embodiments, a first of the hoses 702 and its respective input 532 are configured to provide pressure to the system and may connect to a pressure input line 704; a second of the hoses 702 and its respective input 532 are configured to return/remove pressure to the system and may connect to a pressure output line 706; and a third of the hoses 702 and its respective input 532 are configured as a drain and may connect to a drain line 708.

Figure 8:
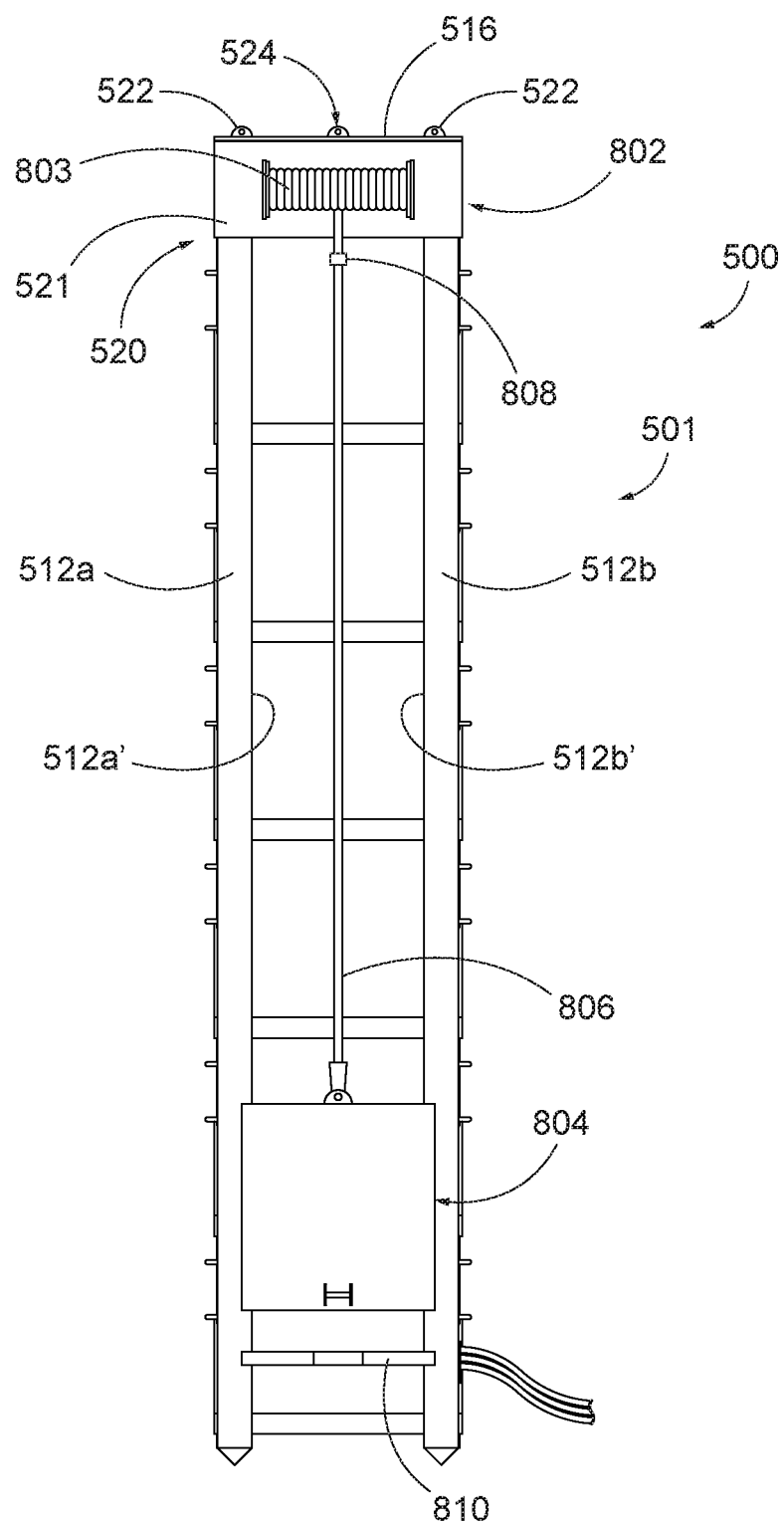
FIG. 8 is a front view of the pile driver of FIG. 5, according to one or more embodiments of the present disclosure.

FIG. 8 is a front view of the pile driver 500 that is outfitted with a lifting mechanism 802 and a pile driver assembly 804, according to one or more embodiments. Here, the lifting mechanism 802 is a winch 803 that is installed on the derrick assembly 501 at a front face of the lifting plate 521 which is disposed on a front face of the tubes 512a,b. However, it may be differently installed on the derrick assembly 501 without departing from the present disclosure, for example, it may be installed within the envelope of the derrick support members 506. Moreover, the lifting mechanism 802 may comprise different mechanisms to hoist the pile driver assembly 804 without departing from the present disclosure.

In the illustrated embodiment, lifting mechanism 802 hoists the pile driver assembly 804 via a cable 806. In some embodiments, a limit switch 808 may be provided on the cable 806 and/or within the lifting mechanism 802 so that the lifting mechanism 802 may automatically stop raising the pile driver assembly 804 when it has reached a predetermined elevation within the derrick assembly 501. In addition, a guide 810 may be provided to orient the object driven to be driven by the pile driver assembly 804 in a desired orientation. As illustrated, for example, the guide 810 may have a central opening to hold a pipe that is to be driven via the pile driver assembly 804. In some embodiments, the guide 810 is removably secured to the tubes 512a,b and configured to be positioned at various elevations depending on the particular end use application.

Figure 9:
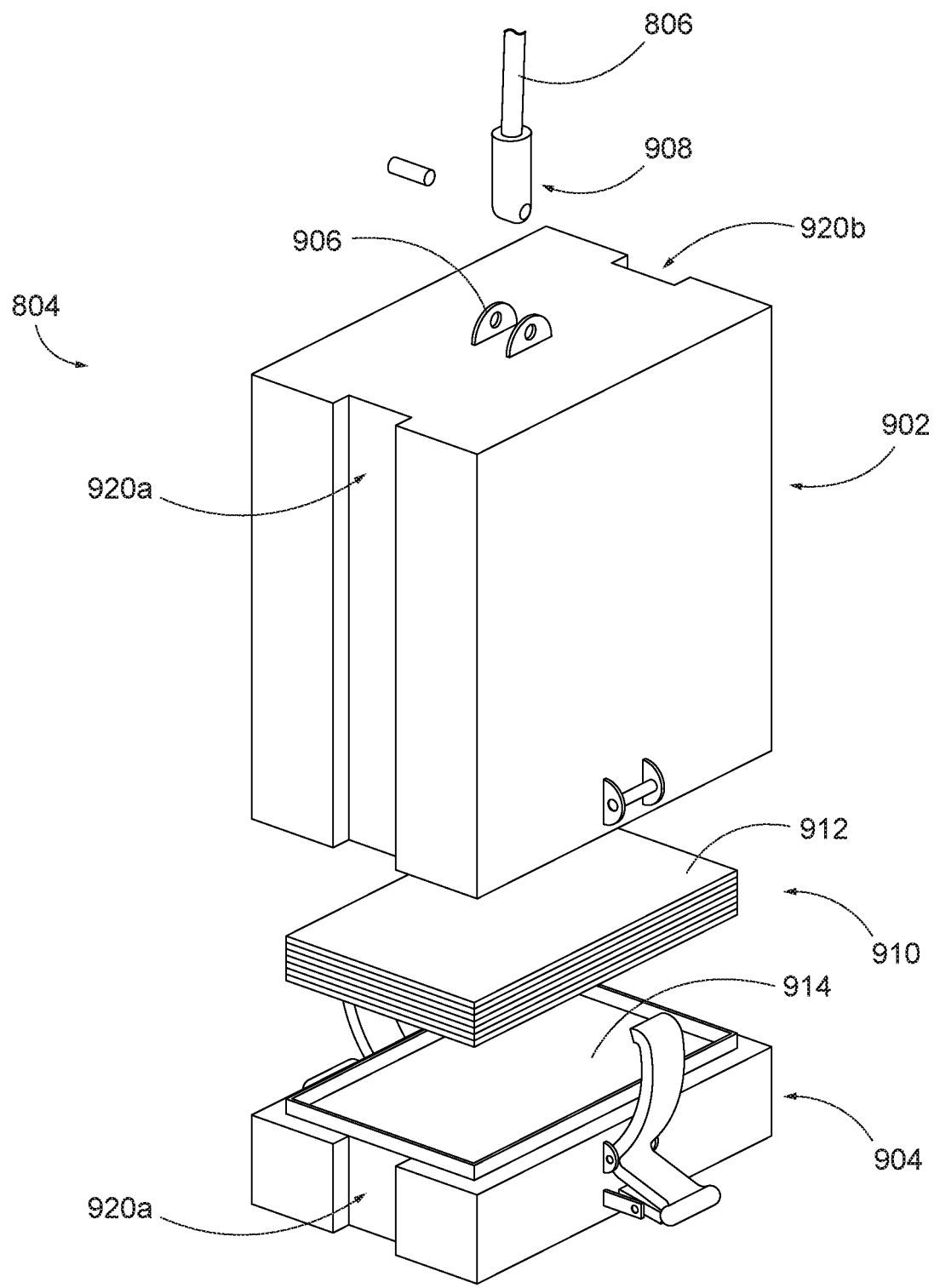
FIG. 9 is a perspective view of a disassembled pile driver assembly that may be utilized with the pile driver of FIGS. 5 and 8, according to one or more embodiments of the present disclosure.

FIG. 9 is a perspective view of the pile driver assembly 804 when disassembled, according to one or more embodiments. The pile driver assembly 804 may include a striker or hammer 902 and a driver or strike plate 904. The pile driver assembly 804 is connected to the wire 806. In the illustrated embodiment, the hammer 902 includes a lug 906 configured to attach to the cable 806, for example, via a pin assembly 908 secured to the cable 806. However, in other embodiments, other mechanisms may be utilized to removably connect the pile driver assembly 804 and the cable 806 or the pile driver assembly 804 may be permanently secured to the cable 806.

The hammer 902 and the strike plate 904 are configured to drive an object, for example, into the ground. For example, the strike plate 904 may be configured as an anvil that is impacted by the hammer 902. The hammer 902 and the strike plate 904 may thus comprise solid, dense material to facilitate forcibly driving objects, and/or may be filled with one or more materials to facilitate impact. In one embodiment, the hammer 902 is filled with dead blow shot and, in another embodiment, both the hammer 902 and the strike plate 904 are filled with dead blow shot. In other embodiments, either or both of the hammer 902 and the strike plate 904 are filled dense particulate matter as known in the art. Utilization of dead blow shot or other similar particulate matter will reduce bouncing of the hammer 902 on the striker plate 904, resulting in more force being transmitted into the pile rather than being wasted on unwanted bouncing.

As detailed below, the hammer 902 and the strike plate 904 may be arranged to separate from each other, for example, following a first impact. In such embodiments, the strike plate 904 is configured as an anvil, may separate from the hammer 902 and rest upon the object to be driven, and, in each subsequent impact, the hammer 902 will strike the strike plate 904 to transmit force through the strike plate 904 into the object to be driven into the ground. In some embodiments, however, the pile driver assembly 804 may further include a cushion 910 disposed between the hammer 902 and the strike plate 904. Where utilized, the cushion 910 includes an impact surface 912 and separates the hammer 902 from the strike plate 904 so that the hammer 902 makes contact with the impact surface 912 of the cushion 910 during impacts. Thus, the hammer 902 may transmit impact force through the cushion 910, into the strike plate 904, and into the object to be driven. In the illustrated embodiment, the cushion 910 comprises sheets of plywood and is secured to a top side 914 of the strike plate 904. Here, the top side 914 of the strike plate 904 includes a outlined surface 916 that is sized to receive the cushion 910 and maintain position of the cushion 910 between the hammer 902 and the strike plate 904. The outlined surface 916 may comprise a recessed pocket formed into the top side 914 of the strike plate 904, a outwardly protruding series or walls that may form an enclosed or partially enclosed fence or tray within which the cushion 910 may fit when resting on the top side 914 of the strike plate 904, or any other feature or structure as known in the art without departing from the present disclosure. It will be appreciated, that the cushion 910 may comprise different materials (or packings of materials) without departing from the present disclosure.

The pile driver assembly 804 may also include a pair of channels, notches, or tracks 920a,920b arranged at opposite sides of the pile driver assembly 804 and configured to orient the pile driver assembly 804 at a desired orientation as it articulates within the derrick assembly 501. The tracks 920a,920b correspond with the tubes 512a,512b, respectively, and the tracks 920a,920b are configured to receive the rail portions 512a',512b' of the tubes 512a,512b, respectively. Thus, the pile driver assembly 804 may slide along the tubes 512a,512b with the rail portions 512a',512b' riding within the tracks 920a,920b, such that the tubes 512a,512b guide the pile driver assembly 804 as it articulates within the derrick assembly 501. In the illustrated embodiment, the tracks 920a,920b extend along both the hammer 902 and the strike plate 904. In other embodiments, the tracks 920a,920b also extend along the cushion 910 or may instead extend along only the hammer 902. Moreover, the tracks 920a,920b are illustrated as being configured with square/rectangular geometries that correspond with corresponding geometries of the tubes 512a,512b; however, in other embodiments, the tracks 920a,920b may have any other geometries (e.g., trapezoidal) that correspond with corresponding geometries of the tubes 512a,512b, without departing from the present disclosure.

Figure 10A:
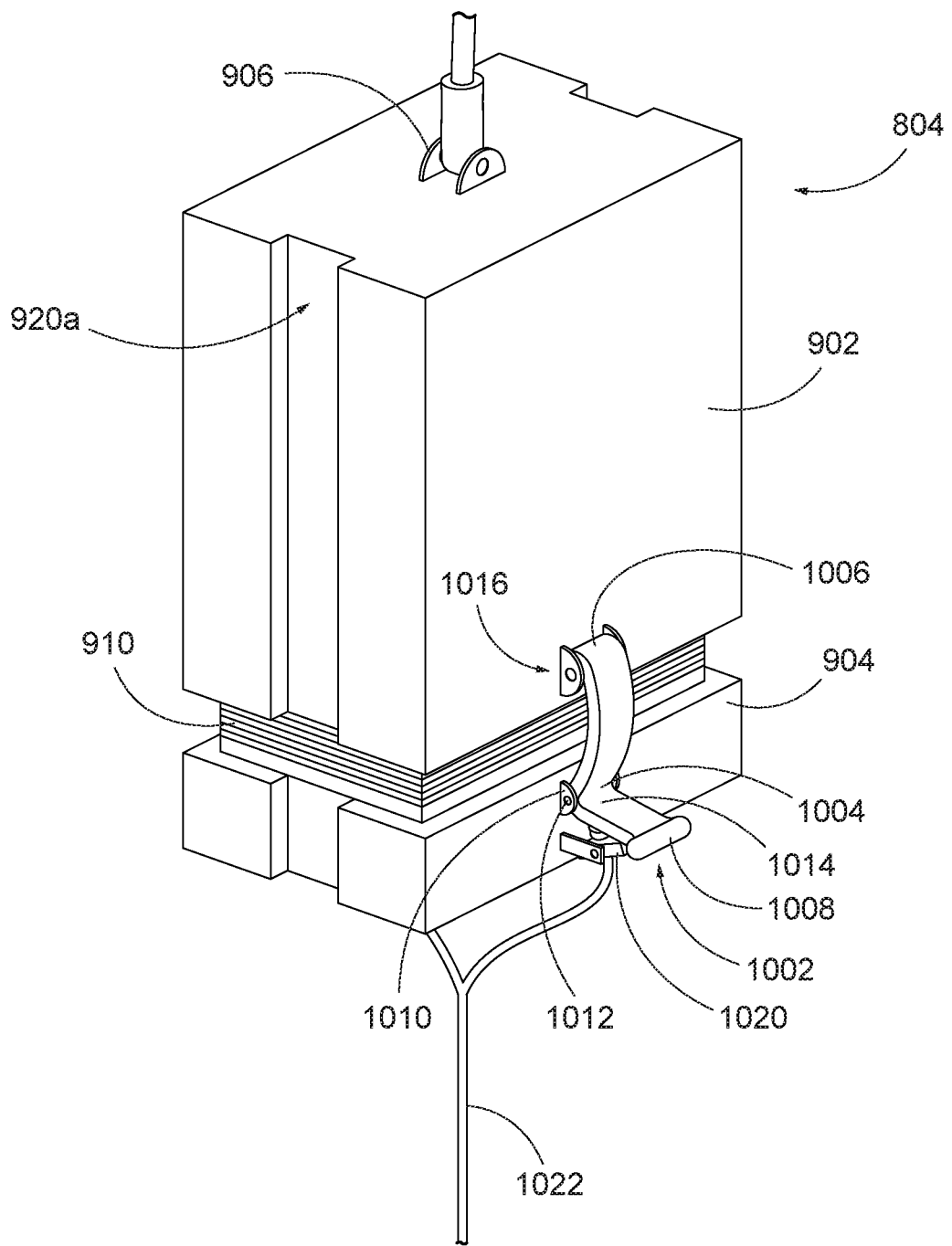
FIGS. 10A-10B respectively illustrate perspective and front views of a locking assembly that may be utilized with the pile driver assembly of FIG. 9, according to one or more embodiments of the present disclosure.
Figure 10B:
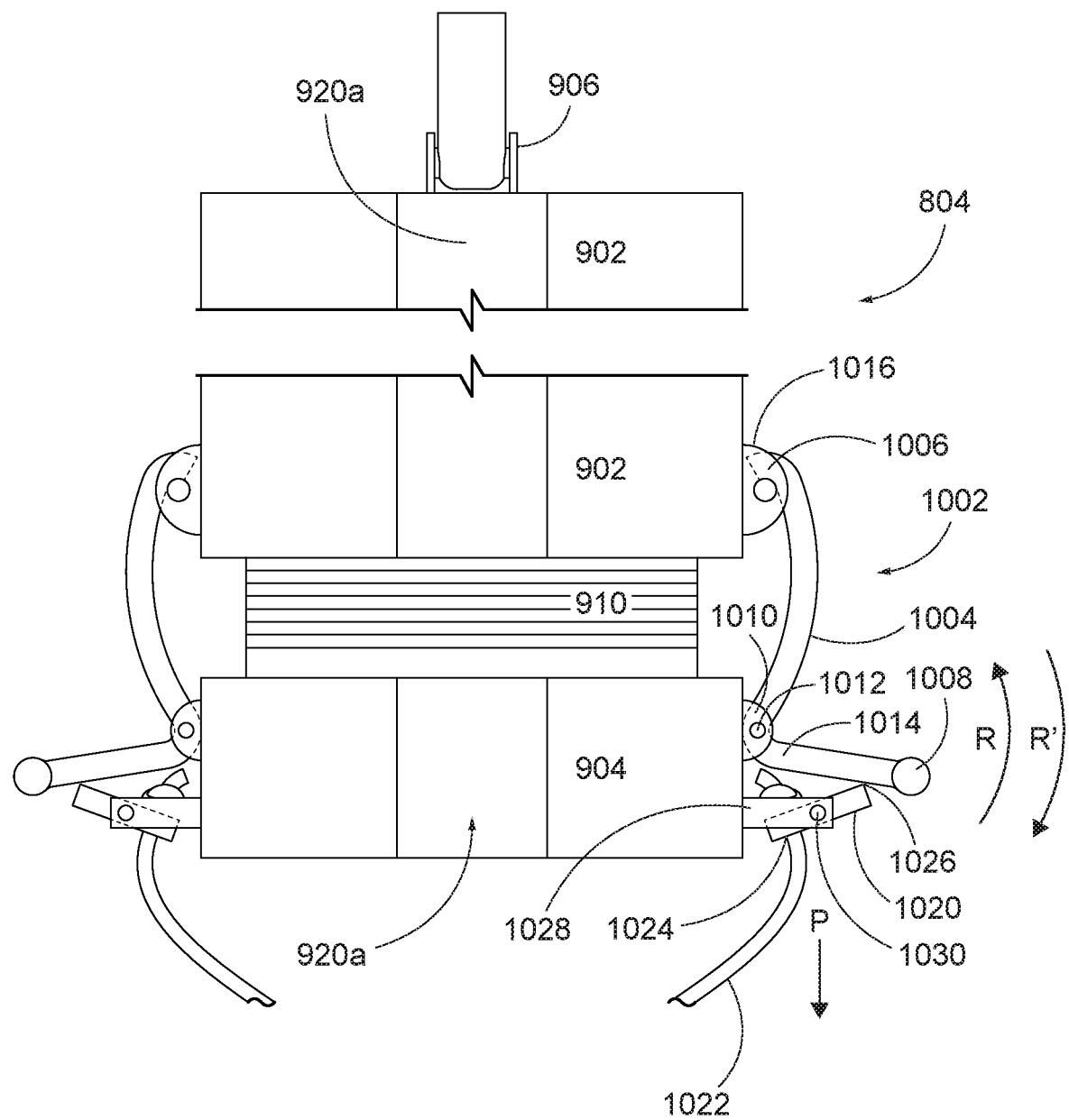

FIGS. 10A-10B illustrate a locking assembly 1002 that may be utilized to secure the hammer 902 and the strike plate 904 together, according to one or more embodiments. In the illustrated embodiment, the locking assembly 1002 is provided on both a front side and a rear side of the pile driver assembly 804. In other embodiments, however, the locking assembly 1002 may instead be provided on a left and right side, may instead be provided just one side (i.e., front, rear, left or right), or may instead be provided on more than any two sides of the pile driver assembly 804, without departing from the present disclosure. The locking assembly 1002 includes a latch 1004 that is configured to articulate relative to the pile driver assembly 804, between a locked position where the strike plate 904 is attached to the hammer 902 and an unlocked position where they are unattached. Here, the latch 1004 includes a hooked end 1006 and a counter weight 1008.

The latch 1004 is connected to the strike plate 904 and configured to pivot relative thereto. In the illustrated embodiment, the latch 1004 is coupled to the strike plate 904 via a bracket or trunnion 1010 and a pin 1012. Here, the trunnion 1010 is secured to a side of the strike plate 904 and receives a pivoting portion 1014 of the latch 1004. The pivoting portion 1014 is secured within the trunnion 1010 via the pin 1012 such that the latch 1004 may pivot on the strike plate 904 about the pin 1012. However, the latch 1004 may be differently coupled to the strike plate 904 via different types of connections, without departing from the present disclosure. Moreover, in other embodiments, the latch 1004 may instead be coupled to the hammer 902, without departing from the present disclosure.

The hammer 902 may include a catch 1016. As will be appreciated, such pivoting of the latch 1004 causes the hooked end 1006 thereof to move towards or away from the catch 1016 of the hammer 902. When the hooked end 1006 moves towards the hammer 902, it may engage the catch 1016 to secure the strike plate 904 to the hammer 902. However, movement of the hooked end 1006 away from the catch 1016 causes the hammer 902 and the strike plate 904 to become uncoupled or unattached. In the illustrated embodiment, the catch 1016 includes a bar that is secured within a bracket, and is configured to be engaged by the hooked end 1006 of the latch 1004; however, the catch 1016 may be differently configured without departing from the present disclosure. For example, the catch 1016 may comprise recesses within the sides of the hammer 902 within which the latch 1004 may engage. In some embodiments, the latch 1004 is long enough to form a gap between the impact surface 914 of the cushion 910 (or strike plate 904) and the hammer 902 when the hooked end 1006 of the latch 1004 is locked within the catch 1016 of the hammer 902 such that the strike plate 904 is locked with the hammer 902. In other embodiments, the latch 1004 is sized so that no gap is formed between the cushion 910 (or strike plate 904) and the hammer 902 when the hooked end 1006 of the latch 1004 is locked within the catch 1016 of the hammer 902 such that the strike plate 904 is locked with the hammer 902.

In some embodiments, the locking assembly 1002 may be remotely actuated to secure the hammer 902 and the strike plate 904 together. In the illustrated embodiment, for example, the locking assembly 1002 includes a latching lever 1020 that may be selectively actuated via a cable or rope 1022. Here, the latching lever 1020 has a first end 1024 that is connected to the rope 1022 and a second end 1026 that is configured to engage a portion of the latch 1004 when the rope 1022 is pulled. Thus, the latching lever 1020 is attached to the pile driver assembly 804 but configured to pivot relative thereto. Here, the latching lever 1020 is secured to the strike plate 904 via a bracket 1028 and a pin 1030 and configured to rotate in a first direction R about the pin 1030 when the rope 1022 is pulled in the direction P. Thus, when the rope 1022 is pulled in the direction P, the latching lever 1020 will rotate in the first direction R about the pin 1030, causing the second end 1026 of the latching lever 1020 to engage the latch 1004 such that the latch 1004 rotates in the first direction R about the pin 1012 until the hooked end 1006 of the latch 1004 engages the catch 1016 of the hammer 902, thereby securing the strike plate 904 to the hammer 902 together.

The pile driver 500 of the present disclosure provides numerous advantages over conventional pile driver units. For example, field operators of conventional pile driver units need to climb the derrick tower structure to manually secure the strike plate to the hammer. Conventional pile driver units thus subject field operators to a number of safety hazards. For example, the field operator may fall off of the derrick tower structure. Also, while manually latching the strike plate to the hammer, the field operator may be injured if the hammer (and/or strike plate) moves. For example, the field operators limbs or fingers may be pinched between the hammer and strike plate. Moreover, field operators are in close proximity to conventional pile driver units when latching the hammer and strike plate thereof, and may thus be injured if the hammer and/or strike plate accidentally fall from their elevated position within the derrick.

When preparing the pile driver 500 for operation, the derrick assembly 501 is first positioned over the pile to be impacted and driven (the "pile") via the pile driver assembly 804. Depending on the height of the pile, the pile driver assembly 804 may raise within the derrick 501 assembly to an appropriate elevation where it is oriented above the pile. As noted above, the guide 810 may also be secured to the derrick assembly 501 at a desired elevation to selectively orient and secure the pile before impact.

Prior to raising the pile driver assembly 804 any further within the derrick assembly 501, the cushion 910 may be arranged between the hammer 902 and the strike plate 904 as described above. When installing the cushion 910 between the hammer 902 and the strike plate 904, the field operator may need to slightly raise the hammer 902 and/or lower the striker plate 904 to create a gap there-between into which the cushion 910 may be inserted. Without any further movement of the hammer 902 and/or the striker plate 904, the field operator may then engage remotely the locking assembly 1002 to latch the strike plate 904 to the hammer 902 by pulling the rope 1022. In other embodiments, however, the field operator may decrease the distance between the hammer 902 and the strike plate 904 before actuating the locking assembly 1002.

The pile driver assembly 804 may then be raised within the derrick assembly 501 via the lifting mechanism 802, with the strike plate 904 attached to the hammer 902 and a cushion 910 optionally disposed there-between. Once the pile driver assembly 804 with the striker plate 904 attached to the hammer 902 is raised and suspended within the derrick assembly 501 by the cable 806, the field operator may release the rope 1022 and allow the latch lever 1020 to rotate in a second direction that is opposite the first direction R so that it no longer engages the latch 1004; however, the hooked end 1006 of the latch 1004 will remain engaged within the catch 1016 of the hammer 902 due to the downward force imparted from the weight of the striker plate 904. Moreover, as the hammer 902 and the striking plate 904 are lifted, there may be a gap between the strike surface 912 of the cushion 910 and an impact surface (not illustrated) of the hammer 902 depending on the size of the latch 1004 and, more specifically, depending on the distance between the hooked end 1006 and the pivot portion 1014 of the latch 1004.

Thereafter, the field operator may cause the lifting mechanism 802 to release the pile driver assembly 804 allowing it to fall, guided within the derrick assembly 501, and impact the pile. Thus, the field operator need not be proximate to the pile driver 500 (i.e., in the danger zone) during assembly of the pile driver assembly 804 and cushion 910, during lifting of the pile driver assembly 804, or during release of the pile driver assembly 804 onto the pile.

Depending on the relative weights of the hammer 902 and the striker plate 904 and depending on the amount of gap between the hammer 902 and the striker plate 904 (if any), the hooked ends 1006 of the latches 1004 may disengage the catches 1016 of the hammer 904 as of the pile driver assembly 804 free falls. For example, if the latch 1004 is sized to create a gap between the strike surface 912 of the cushion 910 and an impact surface (not illustrated) of the hammer 902, that gap may be reduced during free fall of the pile driver assembly 804 such that the hooked ends 1006 disengage from the catches 1016 thereby allowing the counter-weight 1008 to rotate the hooked end 1006 away from the catches 1006. Once the pile driver assembly 804 impacts the pile for the first time, the cushion 910 may be compressed between the hammer 902 and the striker plate 904, and such compression will decrease the thickness of the cushion 910 and thus decrease the distance between the impact surfaces (not illustrated) of the hammer 902 and the strike plate 904. If the hooked ends 1006 of the latches 1004 do not disengage their respective catches 1016 during free fall, they will disengage from their respective catches 1016 when the hammer 902 is resting upon the cushion 910 that has been compacted during first impact. For example, because the cushion 910 has been compressed during first impact, the distance between the hammer 902 and the striker plate 904 has been decreased which permits the hooked ends 1006 of the latches 1004 to disengage their catches 1016 so that, due to gravity, the counter weights 1008 of the latches 1004 may rotate the hooked ends 1006 in a second direction R' away from the catches 1016. Thus, once the plate 902 and the striker plate 904 have moved closer together (e.g., by compressing the cushion 910) to disengage the hooked portions 1006 from the catches 1016, gravity causes the counter weights 1008 to rotate the latches 1004 in the second direction R' away from the catches 1016.

Following a first impact on the pile, the locking assembly 1002 will become disengaged so that the striker plate 904 is unlocked from the hammer 902. The hammer 902 will rest on the cushion 910 (that has been compressed) and the striker plate 904, but the locking assembly 1002 will remain disengaged and unlocked until the field operator re-attaches the striker plate 904 to the hammer 902 by re-actuating the locking assembly 1002. More specifically, gravity acts on the counter weight 1008 and causes the latch 1004 to remain disengaged from the catch 1016 by urging rotation in the second direction R', at least until the field operator causes rotation of the latch 1004 in the first direction R and into engagement with the catches 1016, for example, by pulling the rope 1022.

The hammer 902 may thereafter be re-lifted within the derrick assembly 501 for subsequent pile impacts, while the strike plate 904 and optional cushion 910 remain on top of the pile due to disengagement of the locking assembly 1002 (i.e., the locking assembly 1002 is unlocked). To re-attach the striker plate 904 to the hammer 902 (with or without a cushion 910 sandwiched there-between), the field operator may actuate the locking system 1002 by (i) pulling the rope 1022, which causes the latch lever 1020 to articulate the hooked portion 1006 of the latch into engagement of the catch 1016, and then (ii) lifting the hammer 902. In this manner, the striking plate 904 will be raised with the hammer 902 due to the hooked portions 1006 of the latches catching on the catches 1016, and the field operator may release the rope 1022.

It is noted that the terms "generally" and "substantially" may be used herein to represent the inherent degree of uncertainty that may be attributed to any quantitative comparison, value, measurement, or other representation. These terms are also used herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A hydraulic supply system, comprising:
an auxiliary hydraulic circuit comprising a pump, a power source, and a plurality of plumbing elements through which pressurized and non-pressurized hydraulic fluid flows, wherein the plumbing elements include a manifold configured to receive hydraulic fluid from the pump, a plurality of hydraulic lines extending from the manifold, and at least one valve arranged on each of the plurality of hydraulic lines, wherein at least some of the valves are in fluid communication with an accessory apparatus;
a control system having a first plurality of switches each in communication with a solenoid for controlling operation of the valves which are in communication with the accessory apparatus, a second plurality of switches for controlling operation of at least a portion of the power source, wherein a first relay is in communication with a first of the second plurality of switches and a clutch of the power source and wherein a second relay is in communication with a second of the second plurality of switches and a throttle of the power source, and a third plurality of switches for controlling operation of the accessory apparatus, wherein a third relay is in communication with each of the third plurality of switches and a component of the accessory apparatus; and
a control panel that is positioned remotely from the control system and is in communication with the control system, the control panel includes a plurality of remote switches for selectively controlling the control system.

2. The hydraulic supply system of claim 1, wherein the control panel is in communication with the control system by a connection, wherein the connection is selected from the group consisting of a wireless connection and a wired connection.

3. The hydraulic supply system of claim 1, wherein the accessory apparatus is selected from the group consisting of a pile driver, a drill, a hammer, a hoist, a bucket, and a grapple.

4. The hydraulic supply system of claim 1, wherein the third plurality of switches control operation of the component of the accessory apparatus that is selected from the group consisting of a hydraulic winch and a hydraulic, and combinations of the same.

5. The hydraulic supply system of claim 1, further comprising a heating and cooling system configured to heat and/or cool hydraulic fluid flowing through the auxiliary hydraulic circuit.

6. The hydraulic supply system of claim 1, wherein a first of the third relays is in communication with a first of the third plurality of switches and a winch of the accessory apparatus, and wherein a second of the third relays is in communication with a second of the third plurality of switches and a clutch of the accessory apparatus.

7. A hydraulic supply system comprising:
an auxiliary hydraulic circuit comprising:
a reservoir of hydraulic fluid;
a pump operatively connected to a power source, the pump fluidly connected to the reservoir and configured to pressurize a quantity of hydraulic fluid;
a plurality of hydraulic lines, each hydraulic line comprising at least one valve arranged thereon; and,
a manifold located between and fluidly connected to the pump and each of the hydraulic lines of the plurality of hydraulic lines, wherein the manifold, plurality of hydraulic lines, and associated valves are configured to selectively direct the flow of hydraulic fluid from the reservoir to an accessory apparatus in fluid communication with at least one valve;
a control system operatively connected to a power source including a first plurality of switches, each switch in communication with an associated solenoid for controlling operation of an associated at least one valve arranged on a hydraulic line; and,
a control panel that is positioned remotely from the control system and is in communication with the control system, the control panel including a plurality of remote switches for selectively controlling the control system.

* * * * *